(12) United States Patent
Gossage et al.

(10) Patent No.: US 9,420,207 B2
(45) Date of Patent: Aug. 16, 2016

(54) METHOD FOR CORRECTING IMAGES ACQUIRED VIA ASYNCHRONOUSLY TRIGGERED ACQUISITION

(71) Applicant: Thorlabs, Inc., Newton, NJ (US)

(72) Inventors: Kirk Gossage, Austin, TX (US); Jeffrey Erickson, Cedar Park, TX (US)

(73) Assignee: Thorlabs, Inc., Newton, NJ (US)

( * ) Notice: Subject to any disclaimer, the term of this patent is extended or adjusted under 35 U.S.C. 154(b) by 0 days.

(21) Appl. No.: 14/517,303

(22) Filed: Oct. 17, 2014

(65) Prior Publication Data

US 2015/0124119 A1    May 7, 2015

Related U.S. Application Data

(60) Provisional application No. 61/900,804, filed on Nov. 6, 2013.

(51) Int. Cl.
| | | |
|---|---|---|
| H04N 5/372 | (2011.01) | |
| H04N 5/353 | (2011.01) | |
| G02B 21/36 | (2006.01) | |

(52) U.S. Cl.
CPC .......... *H04N 5/37206* (2013.01); *G02B 21/365* (2013.01); *H04N 5/353* (2013.01)

(58) Field of Classification Search
CPC ............ H04N 5/3537; H04N 5/37206; H04N 5/3743; H04N 5/353; H04N 5/217; H04N 5/37213; G02B 21/365; G02B 21/367; G06K 9/00; G01N 21/9501; G01N 21/6428; G01N 21/274; G01N 21/64; G01N 21/6458; G01N 21/6452; G01N 21/278; G01N 2021/6471; G01N 23/22; G01N 23/225; G06T 7/0004; G06T 7/0018; G06T 7/0044; G06T 2207/10064; G06T 2207/10056; G06T 2207/10024; G06T 2207/30148; G06T 5/009; G06T 5/40; G01J 3/4406; G01J 3/0235; G01J 3/0264; G01J 3/027; H01J 2237/2441; H01J 2237/2446; H01J 2237/2801; H01J 2237/202; H01J 2237/2817; H01J 37/05; H01J 37/28; H01J 37/20; H01L 2223/54466
See application file for complete search history.

(56) References Cited

U.S. PATENT DOCUMENTS

| | | | |
|---|---|---|---|
| 6,507,417 B1 | 1/2003 | Makihira et al. | |
| 7,221,486 B2 * | 5/2007 | Makihira | G06T 7/0004 |
| | | | 352/58 |

(Continued)

FOREIGN PATENT DOCUMENTS

| | | |
|---|---|---|
| DE | 10334210 A1 | 2/2005 |
| WO | 2008032106 A2 | 3/2008 |

OTHER PUBLICATIONS

International Search Report and Written Opinion mailed Feb. 5, 2015 in corresponding International Application No. PCT/US2014/061154.

*Primary Examiner* — Pritham Prabhakher
(74) *Attorney, Agent, or Firm* — Graham Curtin, P.A.

(57) ABSTRACT

A method for correcting images acquired via an asynchronous triggered acquisition, wherein image acquisition is triggered by a trigger signal based on the motion and/or position of the sample to be imaged by an image sensor, the method including: measurement of the motion and/or position of the sample; determination of an exposure time based on the aforementioned measurement; and correction of an acquired image based on the determined exposure time and a desired exposure time.

13 Claims, 3 Drawing Sheets

(56) References Cited

U.S. PATENT DOCUMENTS

| | | | | |
|---|---|---|---|---|
| 7,397,941 B1* | 7/2008 | Adler | G01N 23/225 | 382/144 |
| 7,969,465 B2 | 6/2011 | Batson et al. | | |
| 8,593,625 B2* | 11/2013 | Tanaka | G01N 21/9501 | 356/237.1 |
| 8,743,195 B2* | 6/2014 | Najmabadi | G01N 21/6458 | 348/79 |
| 8,947,521 B1* | 2/2015 | Hill | G01N 21/9501 | 348/295 |
| 2002/0088940 A1* | 7/2002 | Watanabe | H01J 37/224 | 250/310 |
| 2003/0030853 A1* | 2/2003 | Makihira | G06T 7/0004 | 358/486 |
| 2004/0223135 A1 | 11/2004 | Ortyn et al. | | |
| 2007/0069106 A1* | 3/2007 | Krief | G02B 21/244 | 250/201.3 |
| 2007/0147673 A1* | 6/2007 | Crandall | G02B 21/367 | 382/128 |
| 2011/0115897 A1* | 5/2011 | Najmabadi | G01N 21/6458 | 348/79 |
| 2013/0294677 A1* | 11/2013 | Urano | G01N 21/956 | 382/141 |
| 2013/0343632 A1* | 12/2013 | Urano | G06T 7/001 | 382/149 |

\* cited by examiner

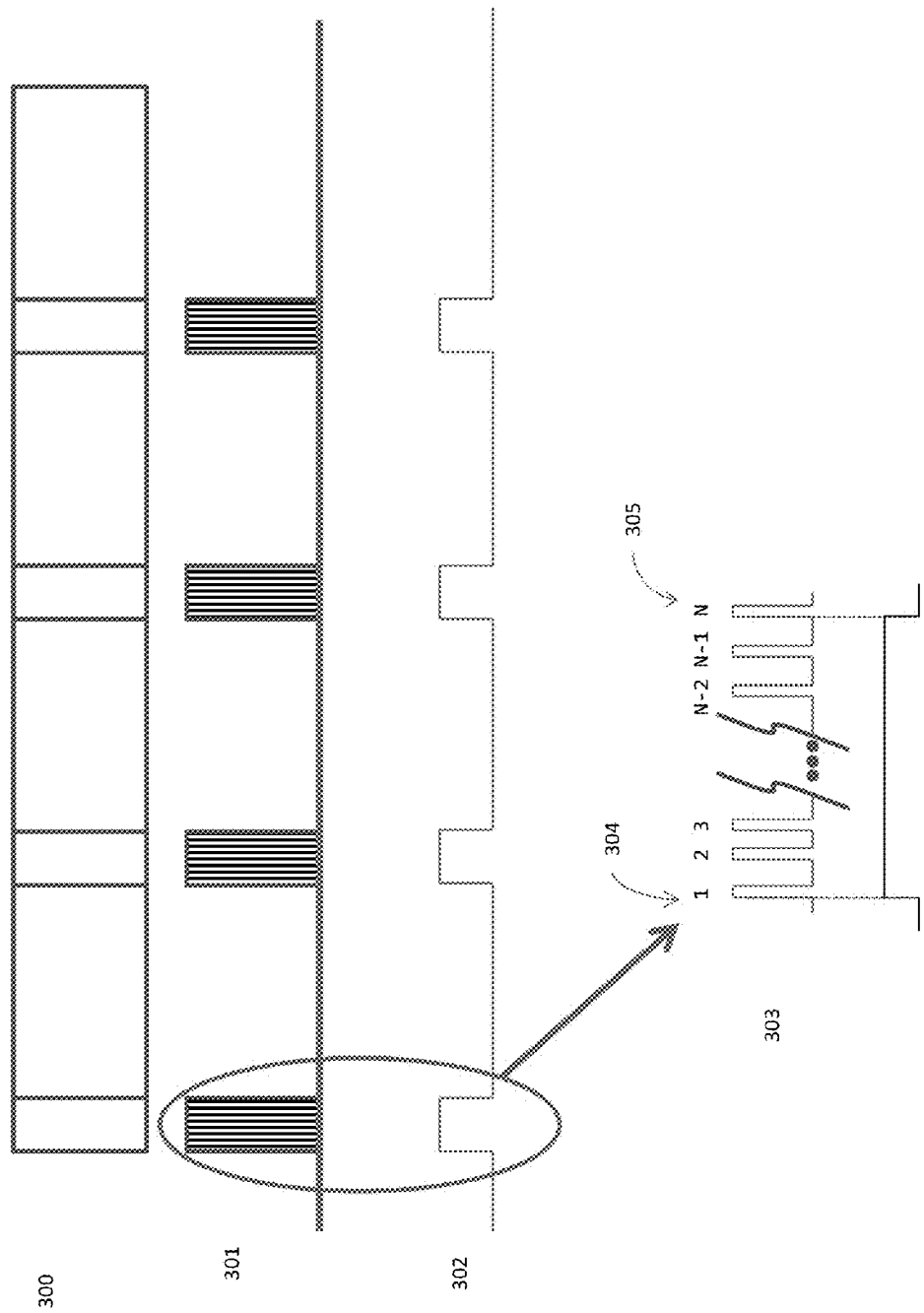

METHOD FOR CORRECTING IMAGES ACQUIRED VIA ASYNCHRONOUSLY TRIGGERED ACQUISITION

CROSS REFERENCES TO RELATED APPLICATIONS

This application claims the benefit of U.S. Provisional Patent Application No. 61/900,804 filed on Nov. 6, 2013. The disclosure of U.S. Provisional Patent Application 61/900,804 is hereby incorporated by reference.

FIELD OF THE INVENTION

The present invention relates to the field of image acquisition and processing, and more particularly to a method for correcting images acquired via an asynchronously triggered acquisition.

BACKGROUND

In order to produce high quality images, there is a need for correcting images in systems where the integration period (exposure time) is not defined in the imager, because external stimulus can introduce errors between the desired exposure time and the true integration period. This is particularly applied to intensity correction in Time Delay Integration (TDI) imaging systems.

In some TDI systems, there is a significant variation of image intensity during a TDI scan. This effect is strongly correlated to changes in the stage velocity. Since snapshot TDI converts a desired exposure time to a stage velocity, corresponding trigger count, and corresponding encoder counts per trigger, certain physical effects (i.e., variation in stage velocity, friction, propagation delay, clock jitter, etc.) can impact the actual exposure time. The principal cause for such variation of image intensity is the result of a model calculation being applied to a real world system.

The method for correcting intensity once the true exposure is known is common knowledge to those in the field. Succinctly, since illumination is constant, the accumulation of intensity in a focal plane array increases linearly with time. Therefore, multiplying the acquired intensity by the ratio of desired exposure time to realized exposure time on a frame by frame basis corrects the difference in intensity proportionally.

However, the method for acquiring the exposure time, particularly in the case of TDI is hardly studied. Applying an exposure correction to a Snapshot TDI has never been done before. Traditional approaches to TDI use an essentially continuous exposure and have no definition of a discrete frame (i.e., traditional TDI results in many lines of data that form a continuous image). However, Snapshot TDI consists of several discrete exposure periods, thereby allowing for a definition of exposure time since there are discrete frames. Therefore, there is a need for a method for correcting for correcting images acquired via an asynchronously triggered acquisition, such as a TDI scan.

SUMMARY

A TDI slide scanning system uses a camera trigger mechanism that itself is triggered by the motion of the x-y stage. This has the benefit of producing images that are already "tiled" spatially because the camera acquisition is triggered by the position of the stage. The disadvantage is that the exposure time of the image is defined by how long it takes the stage to move the distance of a frame, but the velocity of the stage is not perfectly stable. The final result of this position based camera trigger and the stage velocity fluctuations produces composite images with very precise spatial registration, but variability in the image intensity from tile to tile.

To solve this problem, an embodiment of the present invention implements a "strobe" signal that the camera toggles while it's exposing and capturing photons. The width of this strobe pulse is measured for each captured frame and used to correct the resulting image. For example, if the desired exposure time for each frame is 5000 ms and the strobe pulse for an arbitrary frame is 4200 ms, then all of the pixel values for that frame are multiplied by 5000/4200 to bring their intensity to the level it should have been.

In one embodiment, the implementation is using an external device to measure the pulses and send the information to the host PC via serial communications. The post-processing is then performed on the host PC. In a preferred embodiment, implementation is to have a processor on the camera monitor the strobe signal itself and perform the pixel-wise multiplication with another onboard processor, such as an FPGA (Field Programmable Gate Array).

One embodiment of the present invention provides a method for correcting images acquired via an asynchronous triggered acquisition, wherein image acquisition is triggered by a trigger signal based on the motion and/or position of the sample to be imaged by an image sensor, the method including: measurement of the motion and/or position of the sample; determination of an exposure time based on the aforementioned measurement; and correction of an acquired image based on the determined exposure time and a desired exposure time.

Another embodiment of the present invention provides an imaging apparatus, including: a moveable stage to support a sample to be imaged; a stage controller to control a movement of the stage; an image sensor to acquire an image of the sample via an asynchronous triggered acquisition; an image sensor controller to trigger image acquisition of the image sensor; an exposure measurement device to measure an exposure time of the image sensor; and an image processor to process the acquired image; wherein the stage controller outputs a position signal indicating a position of the stage; wherein the image sensor controller outputs a trigger signal based on the position signal; wherein the exposure time is determined based on the position signal; and wherein the image processor performs correction to the acquired image based on the determined exposure time and a desired exposure time.

BRIEF DESCRIPTION OF THE DRAWINGS

FIG. 3 shows the relation between the trigger signal and the strobe signal according to an embodiment of the invention.

DETAILED DESCRIPTION OF THE PREFERRED EMBODIMENTS

Figure 1:
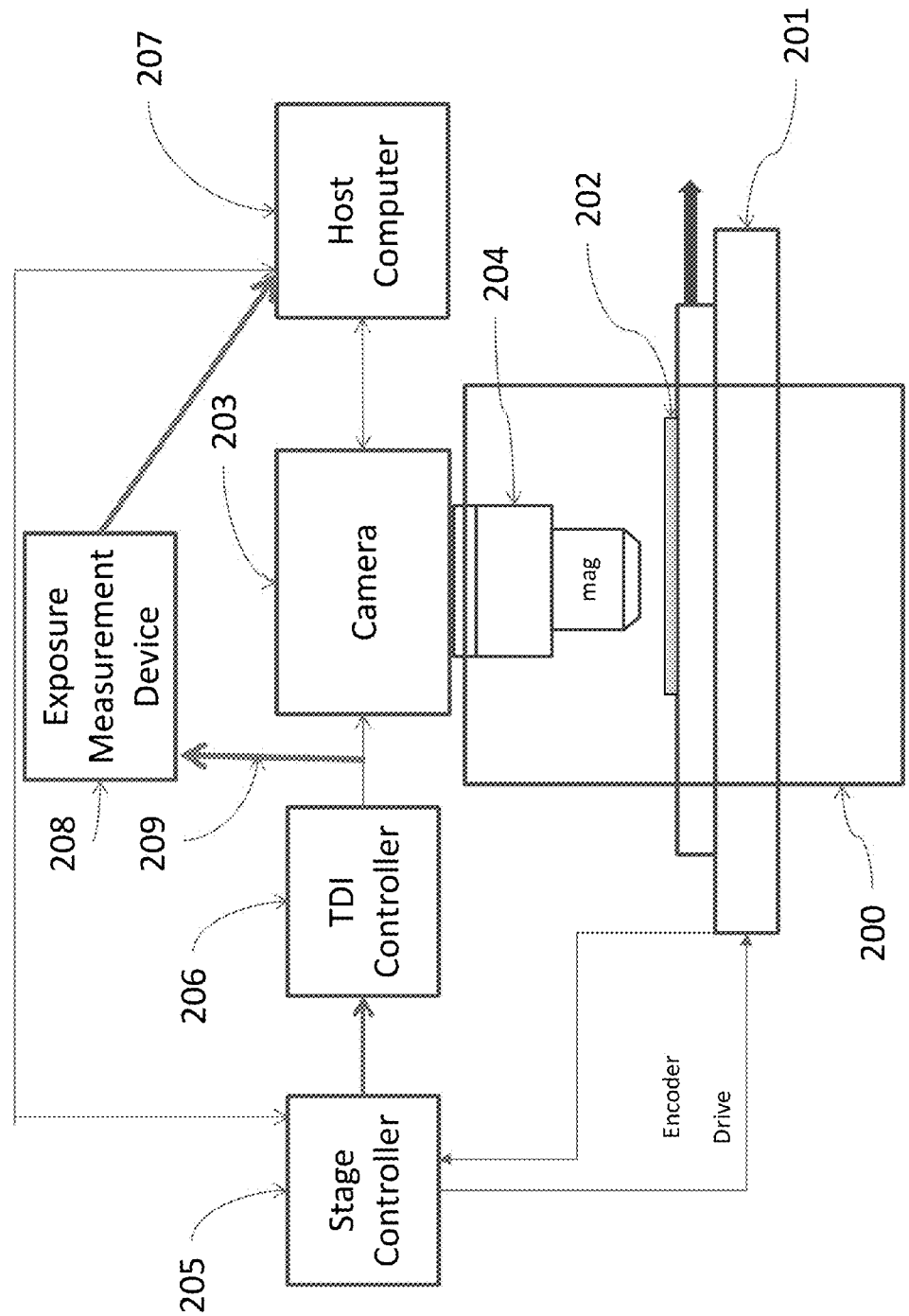
FIG. 1 shows a block diagram of a TDI system with exposure correction according to an embodiment of the invention.

The description of illustrative embodiments according to principles of the present invention is intended to be read in connection with the accompanying drawings, which are to be considered part of the entire written description. In the description of embodiments of the invention disclosed herein, any reference to direction or orientation is merely intended for convenience of description and is not intended in any way to limit the scope of the present invention. Relative terms such as "lower," "upper," "horizontal," "vertical," "above," "below," "up," "down," "top" and "bottom" as well as derivative thereof (e.g., "horizontally," "downwardly," "upwardly," etc.) should be construed to refer to the orientation as then described or as shown in the drawing under discussion. These relative terms are for convenience of description only and do not require that the apparatus be constructed or operated in a particular orientation unless explicitly indicated as such. Terms such as "attached," "affixed," "connected," "coupled," "interconnected," and similar refer to a relationship wherein structures are secured or attached to one another either directly or indirectly through intervening structures, as well as both movable or rigid attachments or relationships, unless expressly described otherwise. Moreover, the features and benefits of the invention are illustrated by reference to the exemplified embodiments. Accordingly, the invention expressly should not be limited to such exemplary embodiments illustrating some possible non-limiting combination of features that may exist alone or in other combinations of features; the scope of the invention being defined by the claims appended hereto.

This disclosure describes the best mode or modes of practicing the invention as presently contemplated. This description is not intended to be understood in a limiting sense, but provides an example of the invention presented solely for illustrative purposes by reference to the accompanying drawings to advise one of ordinary skill in the art of the advantages and construction of the invention. In the various views of the drawings, like reference characters designate like or similar parts.

The interline TDI described herein is a variant of the classic TDI approach for an interline transfer device. In this method, charge is transferred from the photodiode array into the storage area (also known as the vertical CCD or VCCD) and then shifted one or more rows in response to an external signal, analogous to the shifting of charge in the frame transfer TDI sensor. As this process is repeated, charge is accumulated by these successive transfers and shifts. One major benefit of the interline TDI is that a 2-D image can be produced with a still subject and the device can be switched back and forth between TDI and conventional video or snapshot modes.

A device to enable the TDI method is described herein. In FIG. 1, a motorized x-y stage 101, such as the Thorlabs MLS203, is mounted to a microscope (not shown for simplicity), and carries a slide 102. A digital camera 103, such as the Thorlabs 1500M-GE with TDI capability, is mounted on the camera port. In some embodiments, the image sensor used is the camera is a TDI CCD, line scan sensor, interline CCD, frame transfer CCD, or CMOS image sensor. Encoder pulses from the stage are routed to the stage controller 105, and the encoder pulses are buffered and sent along with necessary communication channel for configuration to the TDI controller 106. The camera 103 and stage controller 105 are connected to a host computer or processor 107, which provides overall system control, acquisition of image data, and user interface. The camera is positioned such that one axis of stage motion is parallel with the direction of TDI charge transfer, and the microscope optics are adjusted in proper fashion to illuminate the slide and focus the magnified image of the slide on the camera focal plane.

During a snapshot TDI scan, Host Computer 107 configures the Camera 103, TDI Controller 106, and Stage Controller 105 with an expected number of triggers, number of encoder counts, and desired velocity. The Stage Controller 105 controls the motion of Stage 101, and outputs a quadrature encoder signal that indicates position of Stage 101. This signal is an incremental quadrature signal, meaning that a transition of the signal indicates the stage has moved a known and fixed distance every transition. For an embodiment of the present invention, that distance is on the order of nanometers.

TDI controller 106 takes this position signal and processes it based on configuration received from Host Computer 107 to generate a trigger signal to Camera 103. This processing results in a trigger signal to Camera 103 that ideally occurs every time the stage has moved the pixel-to-pixel spacing of the sensor in Camera 103. Reception of this trigger signal causes Camera 103 to execute TDI shifts on its focal plane array, as described above.

Camera 103 executes TDI shifts on the focal plane array every time a trigger is received. When a trigger is received, Camera 103 increments an internal counter. When this counter reaches a configured value, the camera clocks the sensor to read out the image collected by the sensor. This constitutes the end of exposure. The sensor data is digitized by the camera and delivered to the host as an array of numbers indicating the intensity of each pixel.

The calculations executed by Host Computer 107 assume absolutely constant velocity of stage 101 so that the trigger pulses arrive at camera 103 every time the stage traverses the pixel distance. Also, Host Computer 107 configures camera 103 with a total trigger count and Stage Controller 105 with a stage velocity such that the time it takes for the stage to travel the distance required to generate the requisite number of triggers is equal to a user-defined exposure time.

However, as previously mentioned, this ideal calculation is subject to a number of physical inaccuracies. For example, if the stage slows down, the resultant exposure time will be longer as it will take longer for that distance to be traversed. Similarly, if the stage speeds up, the resultant exposure time will be shorter as the distance will be traversed more quickly. These variations in stage velocity may be well within the specification of Stage Controller 105, but introduce sufficient variation to impact the quality of the image generated by Camera 103.

To correct for these variations, the trigger signals sent to the camera are also sent to an Exposure Measurement Device 108. This device may be included in one or more of any of the other components. During a TDI scan, this device measures the exposure time.

Figure 2:
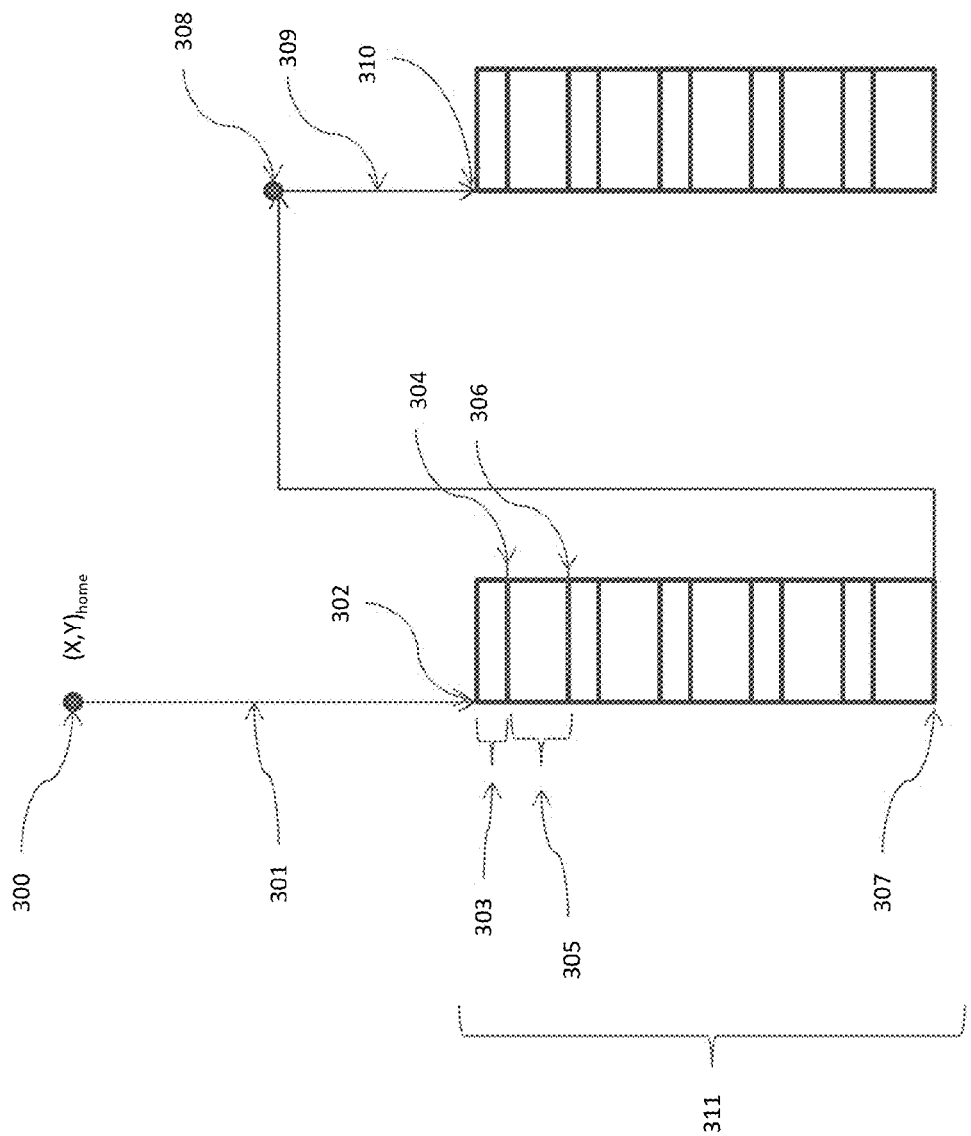
FIG. 2 shows the stage movement and TDI controller process according to an embodiment of the invention.

When a TDI scan is executed, it is conducted in strips. FIG. 2 illustrates the stage movement and TDI controller process conducted in strips. First, the stage is commanded to move to home position 200, denoted by (X,Y)home. This home position can be used as an absolute origin from which further absolute positions referenced. The stage accelerates to desired velocity along the acceleration path 201, before reaching the first frame start position 202. The TDI controller begins converting decoder pulses to trigger pulses during the TDI integration phase 203, until N TDI integration sequences have been completed at position 204. At this point, the TDI controller inhibits further trigger pulses and the camera begins readout of the valid lines. Readout continues through the readout phase 205, and the stage continues moving. Readout is complete when TOTAL_ROWS-N rows have been read out. The controller is programmed with the absolute positions of all subsequent TDI start positions. When the stage reaches the next TDI start position, 206, which is guaranteed by the configuration to occur after the readout of the TOTAL_ROWS-N rows is complete, the process repeats. It continues repeating until the stage reaches the absolute position corresponding to the end of the desired scan 207.

If a larger area is desired, the stage is commanded to the origin of the next acceleration region 208. The stage accelerates through the acceleration region 209, and the TDI sequence resumes at the beginning of the new first frame start position 210. The process repeats as in the first strip, for as many strips as required. The images thus obtained are transferred frame-by-frame to the host computer, where they are stored and displayed for the user.

For a given strip 211, there are several triggering periods 203 followed by several readout periods 205. The exposure of a given frame is defined by the duration of the triggering period. So, the frame read out of the camera at position 206 is collected via TDI integration shifts that occur between position 202 and position 204. The time necessary to traverse the distance between position 202 and position 204 is the true exposure time. The system is configured, as previously mentioned, so this time to traverse the triggering period is equal to a desired exposure time.

FIG. 3 shows the relation between the trigger signal and the strobe signal according to an embodiment of the invention. During the strip 300 (analogous to 211 of FIG. 2), many rapidly occurring triggers 301 are delivered to the camera. These are the triggers corresponding to the TDI integration shifts on the sensor. A signal 302 indicating exposure time, called "strobe" is generated by transitioning to the active state on the active-going edge of the first trigger 304 and transitioning to the inactive state on the inactive-going edge of the last frame trigger 305. By watching the triggers that are delivered to the camera, Exposure Measurement Device 108 generates strobe signal 302 that corresponds to the exposure time. Exposure Measurement Device 108 measures the duration of this pulse and communicates that measurement to the Host Computer 107. Software executed by Host Computer 107 that is used for image acquisition can correct the variations in intensity due to exposure time to the intensity expected at the desired exposure time through multiplication of the values in the image data. In one embodiment, the motion and/or position of the sample is measured in order to determine the exposure time. In another embodiment, the measurement is estimated.

While an embodiment of the present invention is applied to a snapshot TDI method as an example, it could be applied to any asynchronously triggered acquisition mode wherein the generation of signals to control exposure time is impacted in an undesirable way by real time physical imperfections.

While the present invention has been described at some length and with some particularity with respect to the several described embodiments, it is not intended that it should be limited to any such particulars or embodiments or any particular embodiment, but it is to be construed with references to the appended claims so as to provide the broadest possible interpretation of such claims in view of the prior art and, therefore, to effectively encompass the intended scope of the invention. Furthermore, the foregoing describes the invention in terms of embodiments foreseen by the inventor for which an enabling description was available, notwithstanding that insubstantial modifications of the invention, not presently foreseen, may nonetheless represent equivalents thereto.

What is claimed is:

1. A method for correcting images acquired via an asynchronous triggered acquisition, wherein image acquisition is triggered by a trigger signal based on a motion or position of a sample to be imaged by an image sensor, the method comprising:
   measurement of the motion or position of the sample;
   determination of an exposure time based on the aforementioned measurement; and
   correction of an acquired image based on the determined exposure time and a desired exposure time,
   wherein the trigger signal is a quadrature encoder signal that indicates a stage has moved a known and fixed distance in every transition of the signal,
   wherein the asynchronous triggered acquisition is based on a time delay integration (TDI) scan,
   wherein the correction of the acquired image comprises scaling pixel intensity values of the acquired image by a ratio of the desired exposure time to the determined exposure time.

2. The method of claim 1, wherein the trigger signal is used for the measurement.

3. The method of claim 1, wherein the image sensor is a TDI CCD.

4. The method of claim 1, wherein the image sensor is a line scan sensor.

5. The method of claim 1, wherein the image sensor is an interline CCD.

6. The method of claim 1, wherein the image sensor is a frame transfer CCD.

7. The method of claim 1, wherein the image sensor is a CMOS image sensor.

8. The method of claim 1, wherein the measurement is based on a trigger signal that is generated by a controller that controls the motion of the stage.

9. The method of claim 1, wherein the measurement is based on a trigger signal that is generated by a controller that controls a flow cytometer.

10. The method of claim 1, wherein the measurement is estimated.

11. An imaging apparatus, comprising:
   a moveable stage configured to support a sample to be imaged;
   a stage controller configured to control a movement of the stage and to output a position signal indicating a position of the stage;
   an image sensor configured to acquire an image of the sample via an asynchronous triggered acquisition;
   an image sensor controller configured to trigger image acquisition of the image sensor by outputting the trigger signal based on the position signal;
   an exposure measurement device configured to measure an exposure time of the image sensor based on the position signal; and
   an image processor configured to process the acquired image and perform correction to the acquired image based on the determined exposure time and a desired exposure time;
   wherein the trigger signal is a quadrature encoder signal that indicates the stage has moved a known and fixed distance in every transition of the signal,
   wherein the asynchronous triggered acquisition is based on a time delay integration (TDI) scan,
   wherein the correction of the acquired image comprises scaling pixel intensity values of the acquired image by a ratio of the desired exposure time to the determined exposure time.

12. The imaging apparatus of claim 11, wherein the trigger signal is used for the exposure time measurement.

13. The imaging apparatus of claim 11, wherein the image sensor is a TDI CCD, line scan sensor, interline CCD, frame transfer CCD, or CMOS image sensor.

* * * * *